US012591266B2

(12) United States Patent
Debnath et al.

(10) Patent No.: US 12,591,266 B2
(45) Date of Patent: Mar. 31, 2026

(54) FEEDBACK-BASED CLOCK FREQUENCY ADJUSTMENT FOR DYNAMIC CLOCK VOLTAGE SCALING

(71) Applicant: QUALCOMM Incorporated, San Diego, CA (US)

(72) Inventors: Monobrata Debnath, San Diego, CA (US); Anantha Ramaiah Idapalapati, San Diego, CA (US); Azzedine Adam Touzni, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 18/323,257

(22) Filed: May 24, 2023

(65) Prior Publication Data

US 2024/0393823 A1 Nov. 28, 2024

(51) Int. Cl.
*G06F 1/08* (2006.01)

(52) U.S. Cl.
CPC ...................................... *G06F 1/08* (2013.01)

(58) Field of Classification Search
None
See application file for complete search history.

(56) References Cited

U.S. PATENT DOCUMENTS 9,285,858 B2 * 3/2016 Klassen ................ G06F 1/3206
2009/0144568 A1 * 6/2009 Fung ........................ G06F 1/324
713/300

2010/0146316 A1 * 6/2010 Carter ...................... G06F 1/324
713/322
2011/0099404 A1 * 4/2011 Hartmann ............... G06F 1/324
713/323
2013/0019120 A1 * 1/2013 Salsbery ................. G06F 1/324
713/500
2015/0134982 A1 * 5/2015 Park ........................ G06F 1/3296
713/300
2016/0239074 A1 8/2016 Lee et al.
2017/0192484 A1 * 7/2017 Priyadarshi ............. G06F 1/324
2023/0065730 A1 * 3/2023 Jakobsson .............. G06N 3/063
(Continued)

FOREIGN PATENT DOCUMENTS

CN 109116970 A 1/2019
EP 4328712 A1 2/2024
WO 2022246759 A1 12/2022

OTHER PUBLICATIONS

Gupta M., et al., "Dynamic Workload-aware DVFS for Multicore Systems Using Machine Learning", Springer, Computing, 2021, vol. 103, pp. 1747-1769, Oct. 8, 2020.
(Continued)

*Primary Examiner* — Fahmida Rahman
(74) *Attorney, Agent, or Firm* — Loza & Loza LLP

(57) ABSTRACT

An apparatus, including: a set of one or more cores; a processor configured to generate a proposed frequency of a clock signal provided to the set of one or more cores in accordance with a dynamic clock voltage scaling (DCVS); a feedback-based clock frequency adjuster configured to generate an adjustment frequency based on feedback information from the set of one or more cores; and a clock generator configured to generate the clock signal with an effective frequency based on the proposed frequency and the adjustment frequency.

29 Claims, 6 Drawing Sheets

(56) References Cited

U.S. PATENT DOCUMENTS

2023/0071918 A1 * 3/2023 Park ........................ G06F 1/206

OTHER PUBLICATIONS

Jung H., et al., "Continuous Frequency Adjustment Technique Based on Dynamic Workload Prediction", 21st International Conference on VLSI Design, Jan. 2008, 6 Pages.
International Search Report and Written Opinion—PCT/US2024/026668—ISA/EPO—Sep. 13, 2024.

* cited by examiner $$f_{hlosi} = fcn(Load_i)$$

$$f_{effi} = \begin{cases} f_{hlosi} & \text{if } T/P < TH \\ <f_{hlosi} & \text{if } T/P > TH \end{cases}$$

$$f_{hlosi}=fcn(Load_i) \qquad f_{adjij}= \begin{cases} >f_{hlosi} & \text{if } Exe_{ij}=1 \\ f_{hlosi} & \text{if } Exe_{ij}=0 \end{cases} \qquad f_{effij}= \begin{cases} f_{adjij} & \text{if } T/P < TH \wedge Exe_{ij}=1 \\ f_{hlosi} & \text{if } T/P < TH \wedge Exe_{ij}=0 \\ <f_{eff(i-1),j} \text{ or } <f_{effi,(j-1)} & \text{if } T/P \geq TH \end{cases}$$

300

$$f_{hlosi} = fcn(Load_i, f_{effx,y})$$

$$f_{adjij} = \begin{cases} > f_{hlosi} & \text{if } Exe_{ij}=1 \\ f_{hlosi} & \text{if } Exe_{ij}=0 \end{cases} \qquad f_{effij} = \begin{cases} f_{adjij} & \text{if } T/P < TH \wedge Exe_{ij}=1 \\ f_{hlosi} & \text{if } T/P < TH \wedge Exe_{ij}=0 \\ < f_{eff(i-1),j} \text{ or } < f_{effi,(j-1)} & \text{if } T/P \geq TH \end{cases}$$

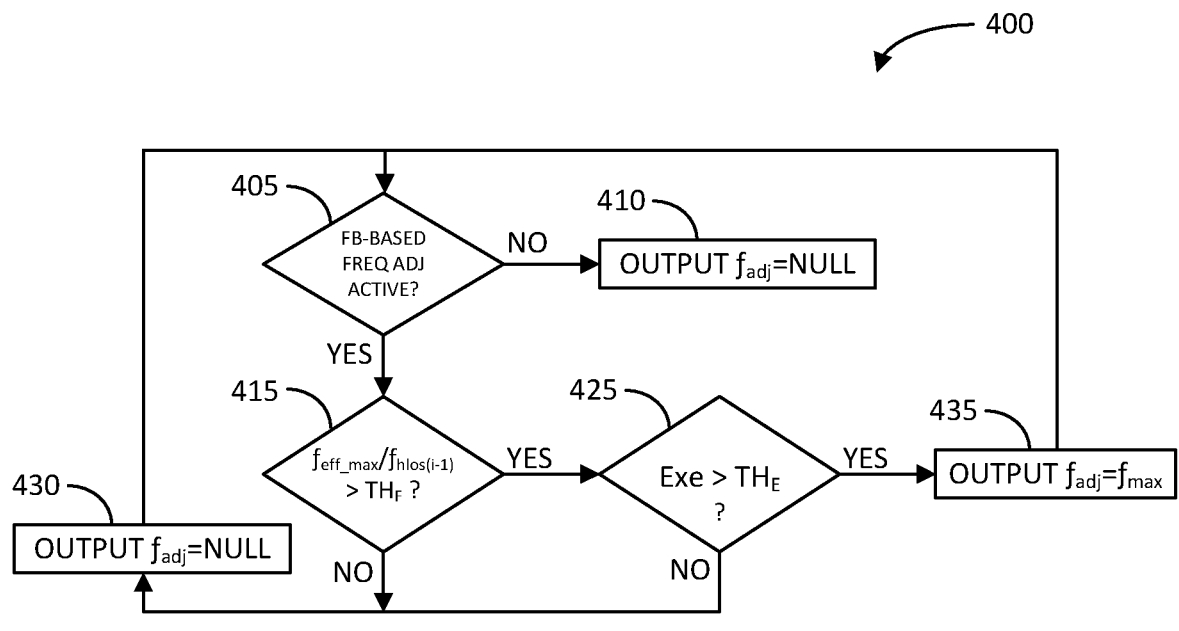
FIG. 4A
$$f_{hlos\_}CONFIDENCE = \begin{cases} 1, f_{hlos} > K^*f_{max} \\ \\ 0, f_{hlos} < K^*f_{max} \end{cases}$$
440
$$FB\text{-}BASED\ FREQ\ ADJ\ OPER\ MODE = \begin{cases} active, f_{hlos\_}CONFIDENCE = 0 \\ \\ inactive, f_{hlos\_}CONFIDENCE = 1 \end{cases}$$
445
FIG. 4B

450

470

FEEDBACK-BASED CLOCK FREQUENCY ADJUSTMENT FOR DYNAMIC CLOCK VOLTAGE SCALING

FIELD

Aspects of the present disclosure relate generally to dynamic clock voltage scaling (DCVS) associated with operating one or more cores, and in particular, to a feedback-based clock frequency adjustment for DCVS operation of a clock domain including one or more cores.

BACKGROUND

A set of one or more cores may operate under different dynamic clock voltage scaling (DCVS) levels. Each of the DCVS levels specify a frequency for a clock signal and an associated supply voltage for operating the set of one or more cores. If, for example, the set of one or more cores are performing a relatively high computational task (e.g., modem/transceiver signal processing, graphics processing, etc.), the DCVS level under which the set of one or more cores operate may be set relatively high (e.g., high frequency clock signal and high supply voltage) to perform the task in a timely manner. If, on the other hand, the set of one or more cores are performing a relatively low computational task (e.g., running a calendar, clock, or calculator application), the DCVS level under which the set of one or more cores operate may be set relatively low (e.g., low frequency clock signal and low supply voltage) to save power.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

Another aspect of the disclosure relates to an apparatus. The apparatus includes: a set of one or more cores; a processor configured to generate a proposed frequency of a clock signal provided to the set of one or more cores in accordance with a dynamic clock voltage scaling (DCVS); a feedback-based clock frequency adjuster configured to generate an adjustment frequency based on feedback information from the set of one or more cores; and a clock generator configured to generate the clock signal with an effective frequency based on the proposed frequency and the adjustment frequency.

Another aspect of the disclosure relates to a method. The method includes: generating a proposed frequency for a clock signal; generating a frequency adjustment based on feedback information received from a set of one or more cores; generating a clock signal with an effective frequency based on the proposed frequency and the frequency adjustment; and providing the clock signal to the set of one or more cores.

Another aspect of the disclosure relates to an apparatus. The apparatus includes: means for generating a proposed frequency for a clock signal; means for generating a frequency adjustment based on feedback information received from a set of one or more cores; means for generating a clock signal with an effective frequency based on the proposed frequency and the frequency adjustment; and means for providing the clock signal to the set of one or more cores.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

BRIEF DESCRIPTION OF THE DRAWINGS

FIG. 4A illustrates a flow diagram of an example method of adjusting a frequency of a clock signal based on feedback information from one or more cores in accordance with another aspect of the disclosure.

FIG. 4B illustrates a flow diagram of an example method of activating/inactivating a feedback-based clock frequency adjuster in accordance with another aspect of the disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1A:
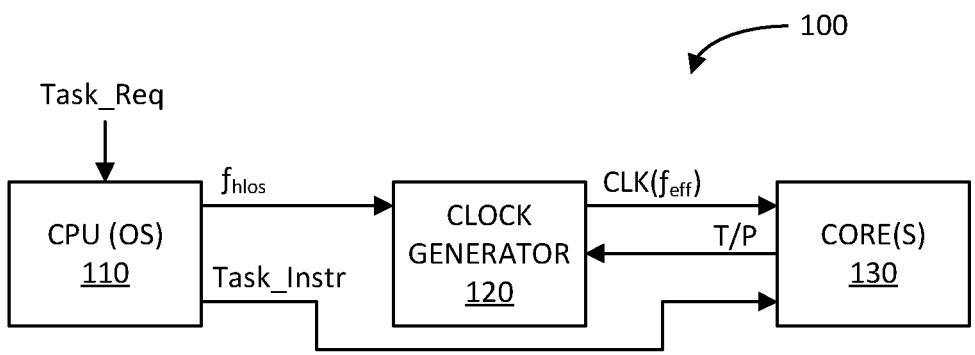
FIG. 1A illustrates a block diagram of an example clock frequency control apparatus in accordance with an aspect of the disclosure.

FIG. 1A illustrates a block diagram of an example clock frequency control apparatus 100 in accordance with an aspect of the disclosure. The clock frequency control apparatus 100 includes an operating system (OS) processor 110 (e.g., a central processing unit (CPU) core processor (CP) or CPUCP), a clock generator 120, and a set of one or more cores 130. The OS CPU 110 may be configured to provide task instructions to the set of one or more cores 130 in accordance with the operating system (OS) and/or task requests from user applications. In response to the task instructions, the set of one or more cores 130 may perform a set of one or more tasks.

The clock generator 120 is configured to provide a clock signal (CLK) cycling at an effective frequency $f_{eff}$ to the set of one or more cores 130 in accordance with a particular dynamic clock voltage scaling (DCVS) level. A DCVS level corresponds to a defined pair of clock frequency and supply voltage appropriate for performing one or more tasks by the set of one or more cores 130. For example, if the task load imposed on the set of one or more cores 130 is computationally intensive (e.g., modem/transceiver signal processing, multimedia digital signal processing (DSP), graphical processing, and/or other), the DCVS level set for the set of one or more cores 130 may be high in terms of clock frequency and supply voltage. Conversely, if the task load imposed on the one or more cores 130 is low computational (e.g., monitoring user inputs, running essentially non-graphical user applications, such as a calendar, clock, or calculator application, or other), the DCVS level set for the set of one or more cores 130 may be low in terms of clock frequency and supply voltage.

As, in this example, the set of one or more cores 130 is/are configured to receive a particular clock signal (CLK) from the clock generator 120, it may be said that the set of one or more cores 130 operate under a particular clock domain. The CPU 110, under the control of the operating system (OS), may provide a proposed frequency $f_{hlos}$ (where "hlos" stands for "high-level operating system") for the clock signal (CLK) based on heuristic and/or historical information associated with an estimated load on the set of one or more cores 130. As the operating system (OS) may estimate the task load on the set of one or more cores 130, the CPU 110 may suggest a proposed frequency $f_{hlos}$ at which the clock signal (CLK) is to be generated for core performance and power consumption consideration.

For example, if the estimated load on the set of one or more cores 130 is relatively high, the CPU 110 may suggest a relatively high proposed frequency $f_{hlos}$ so that the set of one or more cores 130 may perform the associated task(s) in a timely manner. On the other hand, if the estimated load on the set of one or more cores 130 is relatively low, the CPU 110 may suggest a relatively low proposed frequency $f_{hlos}$ so that the set of one or more cores 130 may perform the associated task(s) in a power saving manner. If there are no temperature and/or power issues with the set of one or more cores 130 performing the task(s) in accordance with the clock signal (CLK) at the proposed frequency $f_{hlos}$, the clock generator 120 may generate the clock signal (CLK) with an effective frequency $f_{eff}$ in accordance with the proposed frequency $f_{hlos}$.

For temperature and/or power consumption control purposes, the set of one or more cores 130 may include sensors to generate core temperature and/or power consumption (T/P) information. The set of one or more cores 130 may provide the core T/P information to the clock generator 120. If, for example, the T/P information indicates that the temperature (e.g., junction temperature) of the set of one or more cores 130 exceeds a temperature threshold, the clock generator 120 may throttle the effective frequency $f_{eff}$ of the clock signal (CLK) so as to reduce the temperature of the set of one or more cores 130. Similarly, if the T/P information indicates that the power consumption of (e.g., the current drawn by) the one or more cores 130 exceeds a power/current threshold, the clock generator 120 may throttle the effective frequency $f_{eff}$ of the clock signal (CLK) so as to reduce the power consumption of (e.g., current drawn by) the set of one or more cores 130. In both cases, the effective frequency $f_{eff}$ may be less than the OS proposed frequency $f_{hlos}$.

Figure 1B:
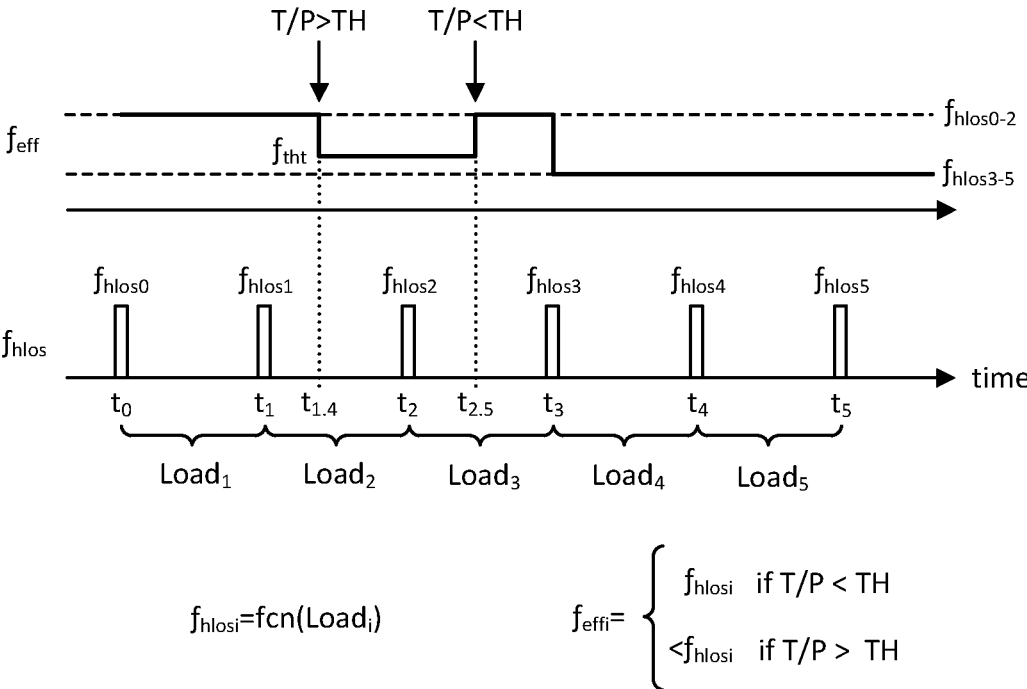
FIG. 1B illustrates a timing diagram of example signals generated pursuant to an example operation of the clock frequency control apparatus of FIG. 1A in accordance with another aspect of the disclosure.

FIG. 1B illustrates a timing diagram of example signals generated pursuant to an example operation of the clock frequency control apparatus 100 in accordance with another aspect of the disclosure. The horizontal axis of the timing diagram represents time. With regard to the vertical axis, the lower section of the timing diagram represents the generation of the OS proposed frequency $f_{hlos}$ by the CPU 110. The upper section of the timing diagram represents the effective frequency $f_{eff}$ of the clock signal (CLK).

With reference to the lower section of the timing diagram, the CPU 110, under the control of the operating system (OS), periodically updates the OS proposed frequency $f_{hlos}$ based on an estimated task load on the set of one or more cores 130. For example, at time $t_0$, the CPU 110 may have generated the OS proposed frequency $f_{hlos0}$ at time $t_0$ based on an estimated load on the set of one or more cores 130 determined prior to time $t_0$. During a first OS proposed frequency $f_{hlos}$ evaluation period between $t_0$ to $t_1$, the CPU 110 estimates the task load on the set of one or more cores 130 to be $\text{Load}_1$. Based on the estimated $\text{Load}_1$, the CPU 110 generates the OS proposed frequency $f_{hlos1}$ at time $t_1$. Similarly, during a second OS proposed frequency $f_{hlos}$ evaluation period between $t_1$ to $t_2$, the CPU 110 estimates the task load on the set of one or more cores 130 to be $\text{Load}_2$. Based on the estimated $\text{Load}_2$, the CPU 110 generates the OS proposed frequency $f_{hlos2}$ at time $t_2$. In a like manner, the CPU 110 continues to periodically evaluate and generate the OS proposed frequencies $f_{hlos3}$ to $f_{hlos5}$ at times $t_3$ to $t_5$ based on estimated $\text{Load}_3$ to Loads (and so on), respectively. As indicated, the $i^{th}$ OS proposed frequency $f_{hlosi}$ is a function or based on the $i^{th}$ estimated $\text{Load}_i$ on the set of one or more cores 130 (e.g., $f_{hlosi}=\text{fcn}(\text{Load}_i)$). The periodicity of the generation of the OS proposed frequency $f_{hlos}$ by the CPU 110 may be four (4) milliseconds (ms), eight (8) ms, or other.

With reference to the upper section of the timing diagram, the clock generator 120 generates the clock signal (CLK) with an effective frequency $f_{eff}$ based on the OS proposed frequency $f_{hlos}$ and the temperature/power (T/P) signal received from the set of one or more cores 130. The upper section of the timing diagram includes an upper horizontal dashed line indicating the OS proposed frequencies $f_{hlos0}$ to $f_{hlos2}$, and a lower horizontal dashed line indicating the OS proposed frequencies $f_{hlos3}$ to $f_{hlos5}$. Additionally, the upper section of the timing diagram indicates a first event between times $t_1$ and $t_2$ where the core T/P exceeds at least one of the thresholds (TH) (e.g., temperature and/or power), and a second event between times $t_2$ and $t_3$ where the core T/P returns to safe operation below the thresholds (TH).

Thus, in accordance with this example, the clock generator 120 generates the clock signal (CLK) with an effective frequency $f_{eff}$ in accordance with or substantially equal to the OS proposed frequencies $f_{hlos0}$ and $f_{hlos1}$ between times $t_0$ and $t_{1.4}$ as the T/P of the set of one or more cores 130 does not exceed the safety thresholds (TH) during such interval. At time $t_{1.4}$, the T/P of the set of one or more cores 130 begins to exceed at least one of the safety thresholds (TH). In response, the clock generator 120 throttles the effective frequency $f_{eff}$ of the clock signal (CLK) to $f_{tht}$, where $f_{tht} < f_{hlos0-2}$. At time $t_{2.5}$, the T/P of the set of one or more cores 130 returns to safe levels below the safety thresholds (TH) due to the throttling of the effective frequency $f_{eff}$ of the clock signal (CLK). At such time, the clock generator 120 may set the effective frequency $f_{eff}$ of the clock signal (CLK) back to the OS proposed frequency $f_{hlos0-2}$.

At time $t_3$, the CPU 110 generates the OS proposed frequency at $f_{hlos3-5}$, which is lower than $f_{hlos0-2}$. This indicates that the CPU 110 determined that the estimated core Loads$_{0-2}$ is higher than the estimated core Loads$_{3-5}$. In response, at time $t_3$, the clock generator 120 generates the clock signal (CLK) with an effective frequency $f_{eff}$ corresponding to the OS proposed frequency $f_{hlos3-5}$. Thus, as indicated in FIG. 1B, the $i^{th}$ effective frequency $f_{effi}$ is substantially equal to the $i^{th}$ OS proposed frequency $f_{hlosi}$ if the T/P does not exceed the safety thresholds (TH), or is lower than the $i^{th}$ OS proposed frequency $f_{hlosi}$ due to throttling if the T/P exceeds at least one of the safety thresholds (TH).

Figure 2A:
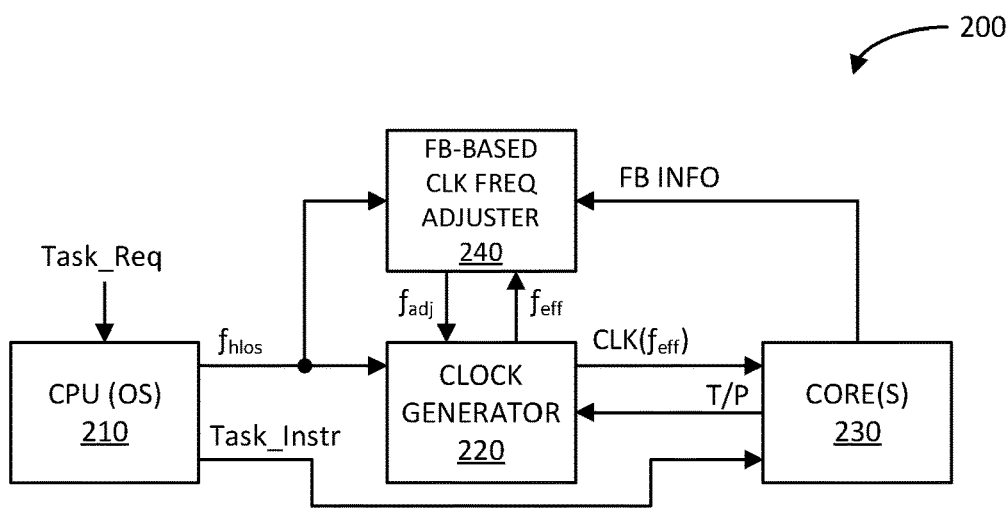
FIG. 2A illustrates a block diagram of another example clock frequency control apparatus in accordance with another aspect of the disclosure.

FIG. 2A illustrates a block diagram of another example clock frequency control apparatus 200 in accordance with another aspect of the disclosure. The clock frequency control apparatus 200 is similar to clock frequency control apparatus 100 previously discussed in detail, and includes same/similar elements as apparatus 100, including an operating system (OS) processor 210 (e.g., a central processing unit core processor (CPUCP)), a clock generator 220, and a set of one or more cores 230. Similarly, the OS CPU 210 provides a set of one or more task instructions to the set of one or more cores 230 based on OS requirements and/or tasks requests from user applications.

The clock generator 220 generates a clock signal (CLK) cycling at an effective frequency $f_{eff}$ in accordance with a dynamic clock voltage scaling (DCVL) level for operating the set of one or more cores 230. The OS CPU 210 may provide an OS proposed frequency $f_{hlos}$ to the clock generator 220 based on an estimated task load on the set of one or more cores 230. The clock generator 220 may also receive a signal indicating core temperature and/or power consumption (T/P) of (e.g., current drawn by) the set of one or more cores 230. The clock generator 220 may set the effective frequency $f_{eff}$ of the clock signal (CLK) based on the OS proposed frequency $f_{hlos}$ and the P/T signal. For example, if the P/T signal indicates that the temperature and/or power consumption of the set of one or more cores 230 does not exceed the safety thresholds (TH), the clock generator 220 may set the effective frequency $f_{eff}$ to the OS proposed frequency $f_{hlos}$; or if the P/T signal indicates that the temperature and/or power consumption of the set of one or more cores 230 exceeds at least one of the safety thresholds (TH), the clock generator 220 may throttle the effective frequency $f_{eff}$ to be less than the OS proposed frequency $f_{hlos}$.

The clock frequency control apparatus 200 further includes a feedback-based clock frequency adjuster 240. Although the feedback-based clock frequency adjuster 240 is shown separate from the OS CPU 310, it shall be understood that the functions performed by the feedback-based clock frequency adjuster 240 may be implemented as an OS algorithm running on the CPU 210. As discussed, the OS CPU 210 may overestimate the OS proposed frequency $f_{hlos}$, where the overestimation may manifest by the temperature and/or power consumption of the set of one or more cores 230 exceeding at least one of the safety thresholds (TH). In a similar token, the OS CPU 210 may underestimate the OS proposed frequency $f_{hlos}$ where a higher effective frequency $f_{eff}$ of the clock signal (CLK) may improve the performance of the set of one or more cores 230. For example, if the operation of the set of one or more cores 230 is execution bound (e.g., most of the data to be processed is at the core(s)), then an effective frequency $f_{eff}$ higher than the OS proposed frequency $f_{hlos}$ may improve the performance of the set of one or more cores 230. On the other hand, if the operation of the set of one or more cores 230 is memory bound (e.g., most of the data to be processed by the core(s) resides in memory), then increasing the effective frequency $f_{eff}$ higher than the OS proposed frequency $f_{hlos}$ may not improve the performance of the set of one or more cores 230.

Accordingly, the feedback-based clock frequency adjuster 240 may receive feedback (FB) information from the set of one or more cores 230 indicating whether it is operating execution bound or memory bound. If, based on the FB information, the feedback-based clock frequency adjuster 240 determines that the operation of the set of one or more cores 230 is execution bound, the feedback-based clock frequency adjuster 240 generates and provides a frequency adjustment $f_{adj}$ to the clock generator 220. As discussed further herein, the generation of the frequency adjustment $f_{adj}$ may also be based on the OS proposed frequency $f_{hlos}$ and the current effective frequency $f_{eff}$. If there are no P/T issues with the core(s) 230, the clock generator 220 may increase the effective frequency $f_{eff}$ of the clock signal (CLK) based on the frequency adjustment signal $f_{adj}$. For example, the clock generator 220 may increase the effective frequency $f_{eff}$ of the clock signal (CLK) to the maximum frequency $f_{max}$ available for the core(s) 230 for that particular clock domain. As discussed further herein, the feedback (FB) information provided by the set of one or more cores 230 to the FB-based clock frequency adjuster 240 may be based on the aggregate instructions per cycles performed by the set of one or more cores 230, which may be detected by one or more instruction counters.

Figure 2B:
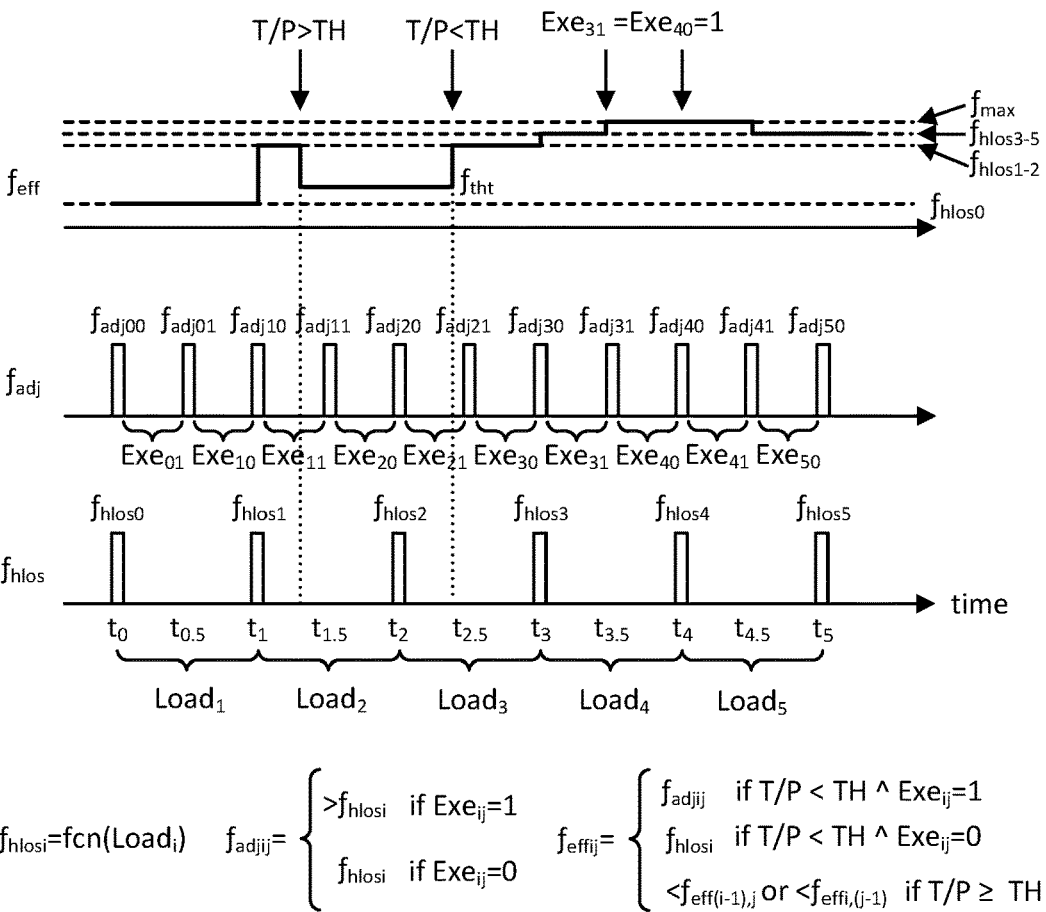
FIG. 2B illustrates a timing diagram of example signals generated pursuant to an example operation of the clock frequency control apparatus of FIG. 2A in accordance with another aspect of the disclosure.

FIG. 2B illustrates a timing diagram of example signals generated pursuant to an example operation of the clock frequency control apparatus 200 in accordance with another aspect of the disclosure. The horizontal axis of the timing diagram represents time. With regard to the vertical axis, the lower section of the timing diagram represents the generation of the OS proposed frequency $f_{hlos}$ by the CPU 210. The middle section of the timing diagram represents the generation of the frequency adjustment signal $f_{adj}$ by the feedback-based clock frequency adjuster 240. The upper section of the timing diagram represents the effective frequency $f_{eff}$ of the clock signal (CLK) generated by the clock generator 220. The lower section of the timing diagram is essentially the same as the lower section of the timing diagram of FIG. 1B previously discussed in detail.

With reference to the middle section of the timing diagram, the feedback-based clock frequency adjuster 240 may periodically receive updates of the FB information from the set of one or more cores 230. The feedback-based clock frequency adjuster 240 may periodically determine the execution bound status of the set of one or more cores 230 based on the periodic updates of the FB information, respectively. The feedback-based clock frequency adjuster 240 may periodically generate the frequency adjustment signal $f_{adj}$ based on the periodic determination of the execution bound status, respectively. Note that the frequency at which the frequency adjustment signal $f_{adj}$ is generated may be higher than the frequency at which the OS proposed frequency signal $f_{hlos}$ is generated (e.g., twice or a factor of 2×, e.g., every two (2) or four (4) ms).

For example, at time $t_0$, the feedback-based clock frequency adjuster 240 may have generated a frequency adjustment signal $f_{adj00}$ based on the execution bound status of the set of one or more cores 230 prior to time $t_0$. During a first execution bound status determination period between times $t_0$ to $t_{0.5}$, the feedback-based clock frequency adjuster 240 determines the execution bound status $Exe_{01}$ of the set of one or more cores 230. Based on the execution bound status $Exe_{01}$, the feedback-based clock frequency adjuster 240 generates the frequency adjustment signal $f_{adj01}$ at time $t_{0.5}$. Similarly, during a second execution bound status determination period between times $t_{0.5}$ to $t_1$, the feedback-based clock frequency adjuster 240 determines the execution bound status $Exe_{10}$ of the set of one or more cores 230. Based on the execution bound status $Exe_{10}$, the feedback-based clock frequency adjuster 240 generates the frequency adjustment signal $f_{adj10}$ at time $t_1$. In a like manner, the feedback-based clock frequency adjuster 240 continues to periodically generate the frequency adjustment signals $f_{adj11}$ to $f_{adj50}$ at times $t_{1.5}$ to $t_5$ based on execution bound status $Exe_{11}$ to $Exe_{50}$ (and so on), respectively. As indicated, the $i^{th}$ frequency adjustment signal $f_{adji}$ is either to increase or maintain the effective frequency $f_{eff}$ as a function or based on the execution bound status $Exe_{ij}$.

With reference to the upper section of the timing diagram, the clock generator 220 generates the clock signal (CLK) with an effective frequency $f_{eff}$ based on the OS proposed frequency, the frequency adjustment signal $f_{adj}$, and the temperature/power (T/P) signal. The upper section of the timing diagram includes an upper horizontal dashed line indicating the maximum available frequency $f_{max}$ for the set of one or more cores 230, a middle upper horizontal dashed line indicating OS proposed frequencies $f_{hlos3}$ to $f_{hlos5}$, a middle lower horizontal dashed line indicating OS proposed frequencies $f_{hlos1}$ to $f_{hlos2}$, and a lower horizontal dashed line indicating the OS proposed frequency $f_{hlos0}$. Additionally, the upper section of the timing diagram indicates a first event at time $t_{1.3}$ where the core T/P begins to exceed the at least one safety thresholds (TH), and a second event between at time $t_{2.4}$ where the core T/P returns to safe operation below the safety thresholds (TH). Further, the upper section of the timing diagram indicates where the feedback-based clock frequency adjuster 240 has determined execution bound operation (Exe=1) of the set of one or more cores 230 at times $t_{3.5}$ and $t_4$ (e.g., memory bound operation at other times).

Thus, in accordance with this example, the clock generator 220 generates the clock signal (CLK) with an effective frequency $f_{eff}$ corresponding to or substantially equal to the OS proposed frequency $f_{hlos0}$ between times $t_0$ and $t_1$ as the T/P of the one or more cores 230 does not exceed the safety thresholds (TH) during such interval and the feedback-based clock frequency adjuster 240 may have not generated the frequency adjustment $f_{adj}$ (e.g., the frequency adjustment signal may be nulled or deasserted), as discussed in more detail further herein. At time $t_1$, the CPU 210 generates OS proposed frequency $f_{hlos1}$, which is higher than the OS proposed frequency $f_{hlos0}$. Thus, the CPU 210 may have determined that the estimated $Load_1$ on the set of one or more cores 230 is higher than the estimated load prior to time $t_0$. In response, at time $t_1$, the clock generator 220 sets the effective frequency $f_{eff}$ of the clock signal (CLK) at the OS proposed frequency $f_{hlos1-2}$.

At time $t_{1.3}$, the T/P of the one or more cores 230 begins to exceed at least one of the safety thresholds (TH). In response, the clock generator 220 throttles the effective frequency $f_{eff}$ of the clock signal (CLK) to $f_{tht}$, where $f_{tht} < f_{hlos1-2}$. At time $t_{2.4}$, the T/P of the one or more cores 230 returns to safe levels below the safety thresholds (TH) due to the throttling of the effective frequency $f_{eff}$ of the clock signal (CLK). At such time, the clock generator 220 may set the effective frequency $f_{eff}$ of the clock signal (CLK) back to the OS proposed frequency $f_{hlos1-2}$. At time $t_3$, the CPU 210 generates the OS proposed frequency at OS proposed frequency $f_{hlos3-5}$, which is higher than $f_{hlos1-2}$. This indicates that the CPU 210 determined that the estimated core $Loads_{3-5}$ is higher than the estimated core $Loads_{1-2}$. In response, at time $t_3$, the clock generator 220 generates the clock signal (CLK) with an effective frequency $f_{eff}$ corresponding to the OS proposed frequency $f_{hlos3-5}$.

At time $t_{3.5}$, the feedback-based clock frequency adjuster 240 determines that the execution bound status $Exe_{31}$ of the set of one or more cores 230 is asserted (e.g., $Exe_{31}=1$), and generates the frequency adjustment signal $f_{adj31}$ (e.g., $f_{adj31}=1$) to increase the effective frequency $f_{eff}$ of the clock signal (CLK). In response, at time $t_{3.5}$, the clock generator 220 increases the effective frequency $f_{eff}$ of the clock signal (CLK) to $f_{max}$. At time $t_4$, the feedback-based clock frequency adjuster 240 determines that the execution bound status $Exe_{40}$ of the set of one or more cores 230 is still asserted (e.g., $Exe_{40}=1$), and continues to generate the frequency adjustment signal $f_{adj40}$ to maintain the effective frequency $f_{eff}$ of the clock signal (CLK) at $f_{max}$. At time $t_{4.5}$, the feedback-based clock frequency adjuster 240 determines that the execution bound status $Exe_{41}$ of the set of one or more cores 230 is not asserted (e.g., $Exe_{41}=0$), and generates the frequency adjustment signal $f_{adj31}$ so as not to increase the effective frequency $f_{eff}$ above the OS proposed frequency $f_{hlos}$. Accordingly, at time $t_{4.5}$, the clock generator 220 decreases the effective frequency $f_{eff}$ of the clock signal (CLK) to the OS proposed frequency $f_{hlos3-5}$.

Figure 3A:
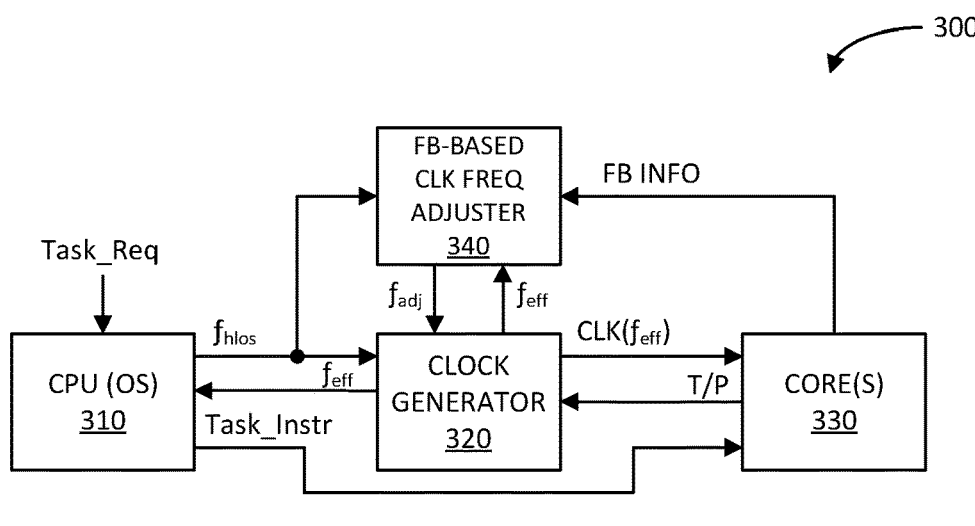
FIG. 3A illustrates a block diagram of another example clock frequency control apparatus in accordance with another aspect of the disclosure.

FIG. 3A illustrates a block diagram of another example clock frequency control apparatus 300 in accordance with another aspect of the disclosure. The clock frequency control apparatus 300 is a variation of clock frequency control apparatus 200 including many same/similar elements, such as the operating system (OS) central processing unit (CPU) 310, a clock generator 320, a set of one or more cores 330, and a feedback-based clock frequency adjuster 340. The OS CPU 310, the clock generator 320, the set of one or more cores 330, and the feedback-based clock frequency adjuster 340 operate in a similar manner as discussed with reference to the same/similar elements 210, 220, 230, and 240 of clock frequency control apparatus 200.

A difference between clock frequency control apparatus 300 and clock frequency control apparatus 200 is that the clock generator 320 may send a signal indicating the effective frequency $f_{eff}$ to the OS CPU 310. The OS CPU 310 may adapt its heuristic and/or historical algorithm for determining the OS proposed frequency $f_{hlos}$ based on the effective frequency $f_{eff}$. For example, if the effective frequency $f_{eff}$ indicates that the OS CPU 310 is often overestimating the OS proposed frequency $f_{hlos}$ (e.g., for many cycles, $f_{eff} < f_{hlos}$), the OS CPU 310 may adapt its algorithm to reduce the frequency of the overestimation of the OS proposed frequency $f_{hlos}$. Similarly, if the effective frequency $f_{eff}$ indicates that the OS CPU 310 is often underestimating the OS proposed frequency $f_{hlos}$ (e.g., for many cycles, $f_{eff} > f_{hlos}$), the OS CPU 310 may adapt its algorithm to reduce the frequency of the underestimation of the OS proposed frequency $f_{hlos}$.

Figure 3B:
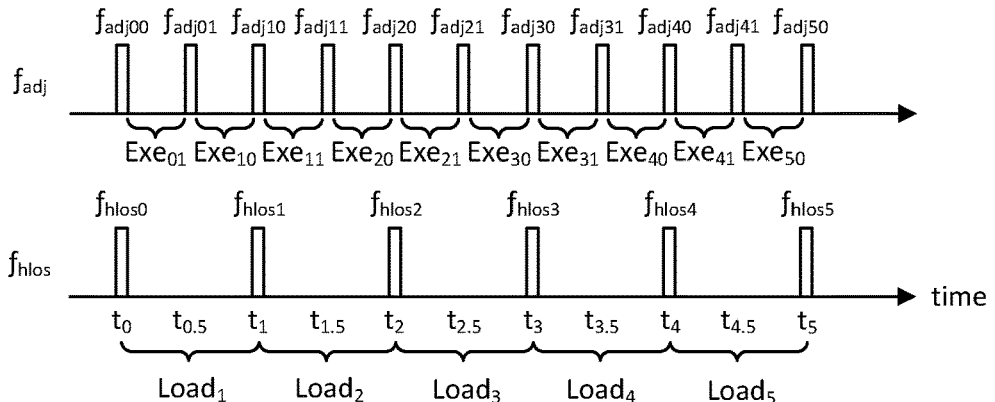
FIG. 3B illustrates a timing diagram of example signals generated pursuant to an example operation of the clock frequency control apparatus of FIG. 3A in accordance with another aspect of the disclosure.

FIG. 3B illustrates a timing diagram of example signals generated pursuant to an example operation of the clock frequency control apparatus 300 in accordance with another aspect of the disclosure. The timing diagram is essentially the same as the timing diagram of FIG. 2B previously discussed in detail, with the exception that the generation of the clock signal (CLK) may be affected by the feeding back of the signal indicating the effective frequency $f_{eff}$ to the OS CPU 310.

For example, at time $t_{2.5}$, instead of the effective frequency $f_{eff}$ returning back to the $f_{hlos1-2}$ level when the P/T decreases below the safety thresholds (TH) as in the example of FIG. 2B, in the case of FIG. 3B, at time $t_{2.5}$, the effective frequency $f_{eff}$ goes to a new level $f_{hlos2-3}$, which is lower than the $f_{hlos1-2}$ level. Thus, in this example, the OS CPU 310 took into account that it may have overestimated the OS proposed frequency $f_{hlos1-2}$ at time $t_1$ based on the throttled effective frequency $f_{eff}$ at time $t_{1.3}$, and set the OS proposed frequency to $f_{hlos2-3}$ instead of the higher $f_{hlos1-2}$. As indicated, the $i^{th}$ OS proposed frequency $f_{hlosi}$ may be a function or based on the $i^{th}$ estimated load$_i$ on the set of one or more cores 330 and one or more previous effective frequencies $f_{effxy}$.

FIG. 4A illustrates a flow diagram of an example method 400 of adjusting an effective frequency $f_{eff}$ of a clock signal (CLK) based on feedback information from one or more cores in accordance with another aspect of the disclosure. The method 400 may be implemented by any of the feedback-based clock frequency adjusters 240 and 340 previously discussed.

According to the method 400, a determination is made whether to activate the feedback-based frequency adjustment (block 405). With further reference to FIG. 4B, this determination 405 may include determining an OS proposed frequency $f_{hlos}$ confidence parameter (block 440). For example, the OS proposed frequency $f_{hlos}$ confidence parameter may be asserted (e.g., indicated as high or logic one (1)) if the OS proposed frequency $f_{hlos}$ is greater than a constant K (e.g., 0.85 or other) multiplied by the maximum available frequency $f_{max}$ for the clock domain associated with a set of one or more cores; otherwise it is deasserted (e.g., low or logic zero (0)) if the OS proposed frequency $f_{hlos}$ is less $K^*f_{max}$. The FB-based frequency adjustment active/inactive determination 405 may further include indicating that it is active if the OS proposed frequency $f_{hlos}$ confidence parameter is low or a logic zero (0), or inactive if the OS proposed frequency $f_{hlos}$ confidence parameter is high or a logic one (1) (block 445). The basis for this is that if the OS proposed frequency $f_{hlos}$ is relatively low (e.g., $f_{hlos} < K^*f_{max}$), then it is more likely that the OS CPU may have underestimated $f_{hlos}$.

Returning back to FIG. 4A, if, in block 405, it is determined that the feedback-based frequency adjustment is inactive, the adjustment frequency $f_{adj}$ may not be generated (e.g., the $f_{adj}$ may be deasserted or nulled) (block 410). If, on the other hand, in block 405, it is determined the feedback-based frequency adjustment is active, the method 400 proceeds to determining whether a ratio of a maximum frequency $f_{eff\_max}$ of all the clock signal(s) provided to a set of one more cores associated with the same clock domain over the current OS proposed frequency $f_{hlos(i-1)}$ is greater than a threshold $TH_F$ (e.g., $f_{eff\_max}/f_{hlos(i-1)} > 0.85$ or other) (block 415). If, in block 415, it is determined that $f_{eff\_max}/f_{hlos(i-1)}$ is less than $TH_F$, then the current OS proposed frequency $f_{hlos(i-1)}$ is not being substantially utilized, and therefore, increasing the effective frequency $f_{eff}$ may not improve the performance of the set of one or more cores. Accordingly, the method 400 includes the adjustment frequency $f_{adj}$ not being generated (e.g., the $f_{adj}$ may be deasserted or nulled) (block 430). If, on the other hand, in block 415, it is determined that $f_{eff\_max}/f_{hlos(i-1)}$ is greater than $TH_F$, the method 400 proceeds to determine whether the operation of the set of one or more cores is execution bound (block 425).

Figure 4C:
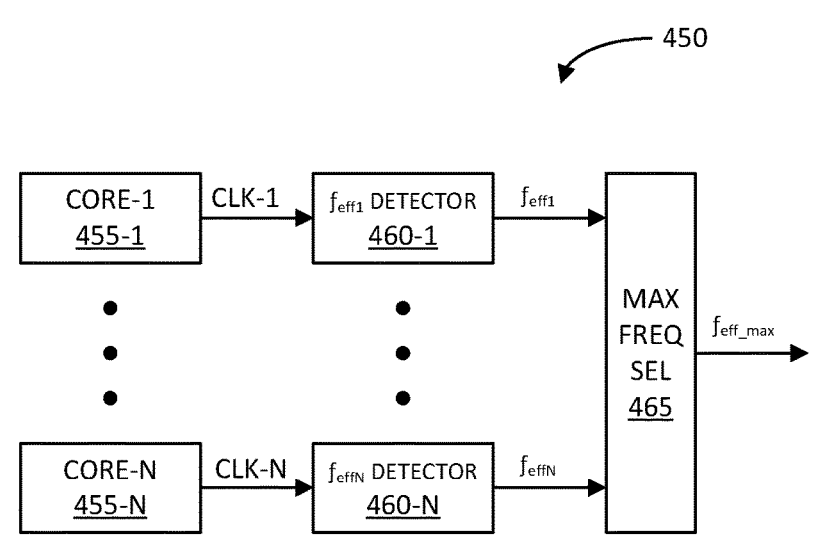
FIG. 4C illustrates a flow diagram of an example method of generating information upon which to determine whether to adjust a frequency of a clock signal in accordance with another aspect of the disclosure.

FIG. 4C is a block diagram of an example clock domain 450 used to explain the clock domain maximum frequency $f_{eff\_max}$ term in accordance with another aspect of the disclosure. The clock domain 450 includes a set of cores 455-1 to 455-N, a set of effective frequency detectors 460-1 to 460-N, and a maximum frequency selector 465, where N is an integer of one or more. The set of cores 455-1 to 455-N are configured to operate under a set of clock signals CLK-1 to CLK-N. The set of effective frequency detectors 460-1 to 460-N are configured to generate a set of effective frequencies $f_{eff1}$ to $f_{effN}$ of the set of clock signals CLK-1 to CLK-N, respectively. The maximum frequency selector 465 is configured to select the maximum of the set of effective frequencies $f_{eff1}$ to $f_{effN}$ to generate the clock domain maximum frequency $f_{eff\_max}$.

Returning back to FIG. 4A, block 425, the determination of whether the operation of the one or more cores is execution bound is based on whether an execution bound parameter Exe (e.g., related to the aggregate number of instruction per cycle (IPC) executed by the set of one or more cores pertaining to a clock domain) is greater than a threshold $TH_E$. As previously discussed, the operation of the set of one or more cores is execution bound if most of the data to be processed is in the core; and thus, the IPCs are relatively high for the set of one or more cores. Conversely, the operation of the set of one or more cores is not execution bound (e.g., is memory bound) if most of the data to be processed by core is in memory; and thus, the IPCs are relatively low as the set of one or more cores are waiting for the data to be transferred from memory.

Figure 4D:
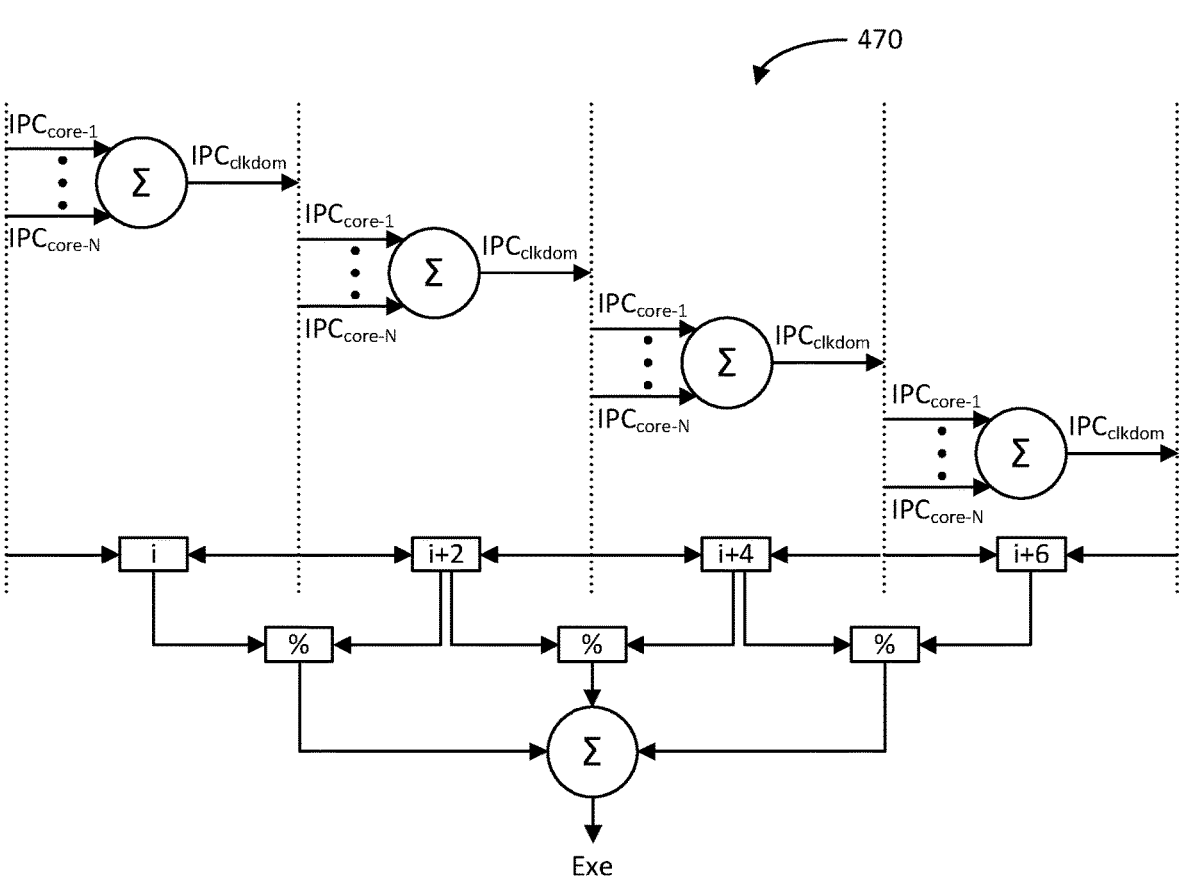
FIG. 4D illustrates a flow diagram of an example method of generating feedback information from one or more cores used to determine whether to adjust a frequency of a clock signal in accordance with another aspect of the disclosure.

With reference to FIG. 4D, an example method 470 of determining the execution bound parameter Exe includes determining the aggregate IPC of the set of one or more cores 1-N (e.g., $IPC_{clkdom} = \Sigma(IPC_{core-1}$ to $IPC_{core-N})$) for a set of evaluation time windows/intervals i, i+2, i+4, and i+6, calculating the percent (%) changes between the aggregate IPCs per adjacent pair of windows i/i+2, i+2/i+4, and i+4/i+6, and then summing ($\Sigma$) the percent changes to generate the execution bound parameter Exe. Thus, if the execution bound parameter Exe is relatively high, the percent changes from window-to-window is relatively high; meaning that the set of one or more cores are increasing the number of IPCs, which indicates a more execution bound operation by the set of one or more cores.

Returning again to FIG. 4A, if, in block 425, it is determined that the execution bound parameter Exe is greater than the execution bound threshold $TH_E$, then the frequency adjustment signal $f_{eff}$ instructs/influences the clock generator to increase the effective frequency $f_{eff}$ of the clock signal (CLK) to the clock domain maximum available frequency $f_{max}$ (block 435). Otherwise, if, in block 425, it is determined that the execution bound parameter Exe is less than the execution bound threshold $TH_E$, the method 400 includes the adjustment frequency $f_{adj}$ not being generated (e.g., the $f_{adj}$ may be deasserted or nulled) (block 430). After the operations per blocks 430 and 435, the method 400 may proceed back to block 405 to repeat the aforementioned process for the next cycle for determination of whether operation of the set of one or more cores is execution bound.

Figure 5:
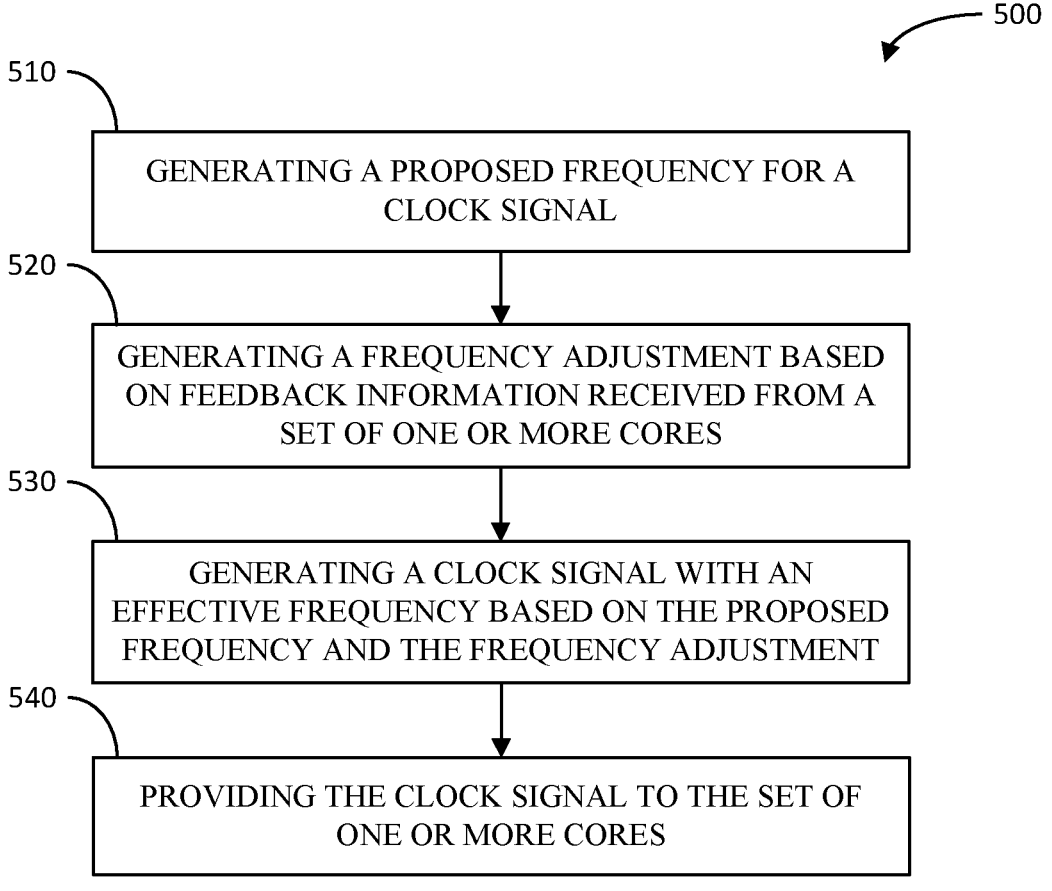
FIG. 5 illustrates a flow diagram of an example method of adjusting a frequency of a clock signal provided to one or more cores in accordance with another aspect of the disclosure.

FIG. 5 illustrates a flow diagram of an example method 500 of adjusting a frequency of a clock signal provided to one or more cores in accordance with another aspect of the disclosure. The method 500 includes generating a proposed frequency for a clock signal (block 510). Examples of means for generating a proposed frequency for a clock signal include any of the operating system (OS) processors described herein. Additionally, the method 500 includes generating a frequency adjustment based on feedback information received from a set of one or more cores (block 520). Examples of means for generating a frequency adjustment based on feedback information received from a set of one or more cores include any of the feedback-based clock frequency adjusters described herein.

Further, the method 500 includes generating a clock signal with an effective frequency based on the proposed frequency and the frequency adjustment (block 530). Examples of means for generating a clock signal with an effective frequency based on the proposed frequency and the frequency adjustment include any of the clock generators 220 and 320. Additionally, the method 500 includes providing the clock signal to the set of one or more cores (block 540). Examples of means for providing the clock signal to the set of one or more cores include the coupling of the clock generators 220 and 320 to the set of one or more cores 230 and 330, respectively.

Some of the components described herein, such as one or more of the subsystems, thermal controllers, and communication interfaces, may be implemented using a processor. A processor, as used herein, may be any dedicated circuit, processor-based hardware, a processing core of a system on chip (SOC), etc. Hardware examples of a processor may include microprocessors, microcontrollers, digital signal processors (DSPs), field programmable gate arrays (FP-GAs), programmable logic devices (PLDs), state machines, gated logic, discrete hardware circuits, and other suitable hardware configured to perform the various functionality described throughout this disclosure.

The processor may be coupled to memory (e.g., generally a computer-readable media or medium), such as a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The memory may store computer-executable code (e.g., software). Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise.

The following provides an overview of aspects of the present disclosure:

Aspect 1: An apparatus, comprising: a set of one or more cores; a processor configured to generate a proposed frequency of a clock signal provided to the set of one or more cores in accordance with a dynamic clock voltage scaling (DCVS); a feedback-based clock frequency adjuster configured to generate an adjustment frequency based on feedback information from the set of one or more cores; and a clock generator configured to generate the clock signal with an effective frequency based on the proposed frequency and the adjustment frequency.

Aspect 2: The apparatus of aspect 1, wherein the feedback information is based on instructions per cycle executed by the set of one or more cores.

Aspect 3: The apparatus of aspect 1 or 2, wherein the feedback information indicates whether an operation of the set of one or more cores is execution bound or memory bound.

Aspect 4: The apparatus of aspect 3, wherein the operation of the set of one or more cores is execution bound if a majority of data to be processed is in the set of one or more cores.

Aspect 5: The apparatus of aspect 3 or 4, wherein the operation of the set of one or more cores is memory bound if a majority of data to be processed by the set of one or more cores resides in memory to be transferred to the set of one or more cores.

Aspect 6: The apparatus of any one of aspects 1-5, wherein the set of one or more cores includes a set of one or more instruction counters configured to generate the feedback information.

Aspect 7: The apparatus of any one of aspects 1-6, wherein the feedback information is based on one or more percent changes of instructions per cycle (IPC) executed by the set of one or more cores over one or more time intervals, respectively.

Aspect 8: The apparatus of any one of aspects 1-7, wherein the clock generator is configured to set the effective frequency of the clock signal above the proposed frequency based on the adjustment frequency.

Aspect 9: The apparatus of aspect 8, wherein the clock generator is configured to set the effective frequency of the clock signal to a maximum frequency available for the set of one or more cores.

Aspect 10: The apparatus of aspect 8 or 9, wherein the feedback-based clock frequency adjuster is configured to generate the adjustment frequency in response to the feedback information indicating an operation of the set of one or more cores being execution bound.

Aspect 11: The apparatus of any one of aspects 1-10, wherein the feedback-based clock frequency adjuster is configured to generate the adjustment frequency based on the proposed frequency.

Aspect 12: The apparatus of any one of aspects 1-11, wherein the feedback-based clock frequency adjuster is configured to generate the adjustment frequency based on a maximum frequency available for the set of one or more cores.

Aspect 13: The apparatus of any one of aspects 1-12, wherein the feedback-based clock frequency adjuster is configured to generate the adjustment frequency based on the proposed frequency being greater than a defined constant multiplied by a maximum frequency available for the set of one or more cores.

Aspect 14: The apparatus of aspect 13, wherein the feedback-based clock frequency adjuster is configured to not generate the adjustment frequency based on the proposed frequency being less than the defined constant multiplied by the maximum frequency available for the set of one or more cores.

Aspect 15: The apparatus of any one of aspects 1-14, wherein the feedback-based clock frequency adjuster is configured to generate the adjustment frequency based on a current effective frequency of the clock signal being greater than a defined constant multiplied by a current proposed frequency.

Aspect 16: The apparatus of any one of aspects 1-15, wherein the processor is configured to generate the proposed frequency based on a set of one or more previous effective frequency of the clock signal.

Aspect 17: The apparatus of any one of aspects 1-16, wherein the processor is configured to generate the proposed frequency based on an estimated task load on the set of one or more cores.

Aspect 18: The apparatus of any one of aspects 1-17, wherein the processor is configured to run an operating system (OS), and wherein the proposed frequency comprises an operating system (OS) proposed frequency.

Aspect 19: The apparatus of any one of aspects 1-18, wherein the clock generator is configured to reduce the effective frequency of the clock signal in response to a temperature associated with the set of one or more cores exceeding a threshold.

Aspect 20: The apparatus of any one of aspects 1-19, wherein the clock generator is configured to reduce the effective frequency of the clock signal in response to a power consumption of or a current drawn by the set of one or more cores exceeding a threshold.

Aspect 21: A method, comprising: generating a proposed frequency for a clock signal; generating a frequency adjustment based on feedback information received from a set of one or more cores; generating a clock signal with an effective frequency based on the proposed frequency and the frequency adjustment; and providing the clock signal to the set of one or more cores.

Aspect 22: The method of aspect 21, wherein the feedback information is based on instructions per cycle executed by the set of one or more cores.

Aspect 23: The method of aspect 21 or 22, wherein the feedback information indicates whether an operation of the set of one or more cores is execution bound.

Aspect 24: The method of any one of aspects 21-23, further comprising increasing the effective frequency of the clock signal above the proposed frequency in response to the frequency adjustment being generated based on the feedback information indicating that an operation of the set of one or more cores is execution bound.

Aspect 25: The method of any one of aspects 21-24, further comprising setting the effective frequency of the clock signal to the proposed frequency in response to the frequency adjustment not being generated based on the feedback information indicating that an operation of the set of one or more cores is not execution bound.

Aspect 26: An apparatus, comprising: means for generating a proposed frequency for a clock signal; means for generating a frequency adjustment based on feedback information received from a set of one or more cores; means for generating a clock signal with an effective frequency based on the proposed frequency and the frequency adjustment; and means for providing the clock signal to the set of one or more cores.

Aspect 27: The apparatus of aspect 26, wherein the feedback information is based on instructions per cycle executed by the set of one or more cores.

Aspect 28: The apparatus of aspect 26 or 27, wherein the feedback information indicates whether an operation of the set of one or more cores is execution bound.

Aspect 29: The apparatus of any one of aspects 26-28, further comprising means for increasing the effective frequency of the clock signal above the proposed frequency in response to the frequency adjustment being generated based on the feedback information indicating that an operation of the set of one or more cores is execution bound.

Aspect 30: The apparatus of any one of aspects 26-29, further comprising means for setting the effective frequency of the clock signal to the proposed frequency in response to the frequency adjustment not being generated based on the feedback information indicating that an operation of the set of one or more cores is not execution bound.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. An apparatus, comprising:
a set of one or more cores;
a processor configured to generate a proposed frequency of a clock signal provided to the set of one or more cores in accordance with a dynamic clock voltage scaling (DCVS);
a feedback-based clock frequency adjuster configured to generate an adjustment frequency based on feedback information from the set of one or more cores; and
a clock generator configured to generate the clock signal with an effective frequency based on the proposed frequency and the adjustment frequency;
wherein the feedback-based clock frequency adjuster is configured to generate the adjustment frequency based on the feedback information in response to the proposed frequency being less than a defined constant of less than one multiplied by a maximum frequency available for the set of one or more cores, and
wherein the defined constant defines a confidence level for the proposed frequency of a clock signal relative to the maximum frequency.

2. The apparatus of claim 1, wherein the feedback information is based on instructions per cycle executed by the set of one or more cores.

3. The apparatus of claim 1, wherein the feedback information indicates whether an operation of the set of one or more cores is execution bound or memory bound.

4. The apparatus of claim 3, wherein the operation of the set of one or more cores is execution bound if a majority of data to be processed is in the set of one or more cores.

5. The apparatus of claim 3, wherein the operation of the set of one or more cores is memory bound if a majority of data to be processed by the set of one or more cores resides in memory to be transferred to the set of one or more cores.

6. The apparatus of claim 1, wherein the set of one or more cores includes a set of one or more instruction counters configured to generate the feedback information.

7. The apparatus of claim 1, wherein the feedback information is based on one or more percent changes of instructions per cycle (IPC) executed by the set of one or more cores over one or more time intervals, respectively.

8. The apparatus of claim 1, wherein the clock generator is configured to set the effective frequency of the clock signal above the proposed frequency based on the adjustment frequency.

9. The apparatus of claim 8, wherein the clock generator is configured to set the effective frequency of the clock signal to a maximum frequency available for the set of one or more cores.

10. The apparatus of claim 8, wherein the feedback-based clock frequency adjuster is configured to generate the adjustment frequency in response to the feedback information indicating an operation of the set of one or more cores being execution bound.

11. The apparatus of claim 1, wherein the feedback-based clock frequency adjuster is configured to generate the adjustment frequency based on the proposed frequency.

12. The apparatus of claim 1, wherein the feedback-based clock frequency adjuster is configured to generate the adjustment frequency based on a maximum frequency available for the set of one or more cores.

13. The apparatus of claim 1, wherein the feedback-based clock frequency adjuster is configured to not generate the adjustment frequency based on the proposed frequency being greater than the defined constant multiplied by the maximum frequency available for the set of one or more cores.

14. The apparatus of claim 1, wherein the feedback-based clock frequency adjuster is configured to generate the adjustment frequency based on a current effective frequency of the clock signal being greater than a defined constant multiplied by a current proposed frequency.

15. The apparatus of claim 1, wherein the processor is configured to generate the proposed frequency based on a set of one or more previous effective frequency of the clock signal.

16. The apparatus of claim 1, wherein the processor is configured to generate the proposed frequency based on an estimated task load on the set of one or more cores.

17. The apparatus of claim 1, wherein the processor is configured to run an operating system (OS), and wherein the proposed frequency comprises an operating system (OS) proposed frequency.

18. The apparatus of claim 1, wherein the clock generator is configured to reduce the effective frequency of the clock signal in response to a temperature associated with the set of one or more cores exceeding a threshold.

19. The apparatus of claim 1, wherein the clock generator is configured to reduce the effective frequency of the clock signal in response to a power consumption of or a current drawn by the set of one or more cores exceeding a threshold.

20. A method, comprising:
generating a proposed frequency for a clock signal;
generating a frequency adjustment based on feedback information received from a set of one or more cores in response to the proposed frequency being less than a defined constant of less than one multiplied by a maximum frequency available for the set of one or more cores;

generating a clock signal with an effective frequency based on the proposed frequency and the frequency adjustment; and
providing the clock signal to the set of one or more cores,
wherein the defined constant defines a confidence level for the proposed frequency of a clock signal relative to the maximum frequency.

21. The method of claim 20, wherein the feedback information is based on instructions per cycle executed by the set of one or more cores.

22. The method of claim 20, wherein the feedback information indicates whether an operation of the set of one or more cores is execution bound.

23. The method of claim 20, further comprising increasing the effective frequency of the clock signal above the proposed frequency in response to the frequency adjustment being generated based on the feedback information indicating that an operation of the set of one or more cores is execution bound.

24. The method of claim 20, further comprising setting the effective frequency of the clock signal to the proposed frequency in response to the frequency adjustment not being generated based on the feedback information indicating that an operation of the set of one or more cores is not execution bound.

25. An apparatus, comprising:
means for generating a proposed frequency for a clock signal;
means for generating a frequency adjustment based on feedback information received from a set of one or more cores in response to the proposed frequency being less than a defined constant of less than one multiplied by a maximum frequency available for the set of one or more cores;
means for generating a clock signal with an effective frequency based on the proposed frequency and the frequency adjustment; and
means for providing the clock signal to the set of one or more cores,
wherein the defined constant defines a confidence level for the proposed frequency of a clock signal relative to the maximum frequency.

26. The apparatus of claim 25, wherein the feedback information is based on instructions per cycle executed by the set of one or more cores.

27. The apparatus of claim 25, wherein the feedback information indicates whether an operation of the set of one or more cores is execution bound.

28. The apparatus of claim 25, further comprising means for increasing the effective frequency of the clock signal above the proposed frequency in response to the frequency adjustment being generated based on the feedback information indicating that an operation of the set of one or more cores is execution bound.

29. The apparatus of claim 25, further comprising means for setting the effective frequency of the clock signal to the proposed frequency in response to the frequency adjustment not being generated based on the feedback information indicating that an operation of the set of one or more cores is not execution bound.

* * * * *